Nov. 11, 1958   D. L. SCHRADER   2,860,266
LINEAR ACTUATOR
Filed Feb. 6, 1957
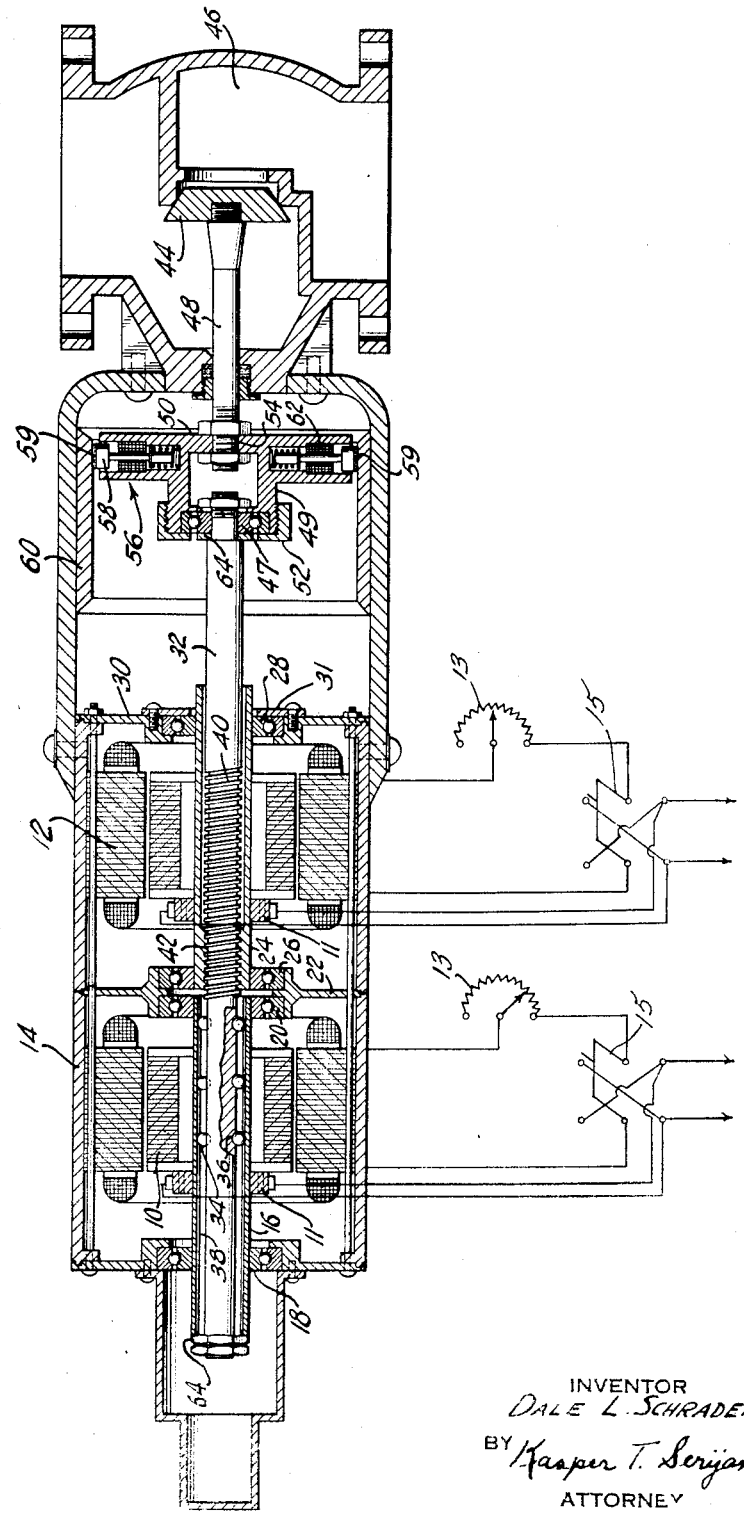
INVENTOR
DALE L. SCHRADER
BY Kasper T. Serijan
ATTORNEY United States Patent Office 2,860,266
Patented Nov. 11, 1958

2,860,266

LINEAR ACTUATOR

Dale L. Schrader, Carlsbad, N. Mex., assignor to American Metal Climax, Inc., New York, N. Y., a corporation of New York Application February 6, 1957, Serial No. 638,490

5 Claims. (Cl. 310—112)

This invention relates to an actuator system or linear actuator of the type suitable for providing a thrusting and pulling force. More particularly, this invention relates to a dual drive actuator system capable of producing a positive thrusting or pulling force acting in a straight line which force may be readily and accurately controlled. The device is useful in connection with applications involving the operation of valves and other devices such as gates, doors, louvers, levers, wing and tail flaps of aircraft and the like which require a straight line thrusting and pulling force in their operation. It may also be used where reciprocating motion is required in slow speed machines using such motion.

Various types of systems for enabling controlled operation of the aforesaid and similar components are presently in use. Air and hydraulic cylinders are commonly used where it is required to transmit forces in a straight line. Motors geared to give very slow output speeds and arranged to provide straight line motion are used, for example, for opening or closing ventilating louvers and doors. Motor operated valves employing gear reducers and worm gears are used for controlling flow in pipe lines with the valve regulation achieved through thrusting and pulling forces applied to the valve mechanism. Compressed air is used to actuate diaphragm-type controllers for opening and closing valves. Still another type employs a pump which forces hydraulic fluid into a cylinder or behind a diaphragm which serves to actuate a valve associated therewith.

These and similar devices may be adapted for the manual control of operations involved or for automatically controlling the operation involved through suitable instrumentation. In order to achieve the desired operation and control, however, either a combination of electricity and air, electricity and fluids, or electricity and complex gear drive speed reducers is generally required. Although each of these systems has its advantages, there is a great need for an actuator which requires only electricity in combination with a very simple mechanical arrangement for giving rectilinear motion. Providing compressed air, hydraulic devices and gear reducers with slow output speeds is costly. Such devices require maintenance which could be eliminated if it was not necessary to use them. The use of electronic means for controlling valves has been slow in developing because no completely satisfactory method has been available for producing rectilinear motion by electrical means only.

The present invention provides an actuator system for transmitting a force linearly where the thrusting and pulling force is produced by the difference in the speed of two independently rotated hollow shafts arranged in continuous and parallel alignment with each other which act upon a third shaft within the hollow of the two shafts. A separate variable speed motor or other driving means is required for rotating each tubular shaft either in the same or opposite direction at speeds which may be varied independently of each other with the difference in the rotative speed of the motors being transmitted through the tubular shafts to act upon a common shaft. The pulling or thrusting force developed with respect to the latter is a function of the difference in torque created by variation in speed or direction of the two motors. The actuating system in its entirety is of relatively simple construction and is extremely effective in its operation assuring positive and precise positioning of the actuated device. The actuator system herein disclosed readily lends itself to adaptation for use with manual or automatic control with no need for compressed air, hydraulic fluids or complex gear drive, speed reducers.

The primary object of the invention, therefore, is to provide an actuator system of relatively simple construction which is highly efficient and reliable in its operation resulting in the production of a controllable longitudinal force acting in a straight line, which force may be used for controlling the operation of a valve or the like requiring a thrusting and pulling action for adjusting, positioning or reciprocating purposes.

Another object of the invention is to provide a dual drive actuator system suitable for producing rotational as well as linear movement either singly or simultaneously which movements may be advantageously utilized in the operation of control devices remotely positioned with respect thereto.

Yet another object of the invention is to provide a dual drive linear actuator wherein the longitudinal movement of a single driven shaft positioned within two tubular shafts in axial alignment with each other may be subjected to positive and precise control by variation in speed or direction or rotation of said tubular shafts each of which is operated by a variable speed motor.

A further object of the invention is to provide an actuating system suitable for use in control operations requiring a thrusting or pulling force for positioning valve elements or the like, which system is readily adaptable for automatic operation without the use of air, hydraulic fluids or complex gearing systems.

Other objects and advantages will become apparent to those skilled in the art as this specification proceeds.

The invention will be more clearly understood by reference to the following detailed description and the accompanying drawing in which a preferred embodiment of the actuator is shown in longitudinal section in association with a conventional valve of the type commonly used in fluid flow control to illustrate its utilization. It will be understood that the actuator system herein described is neither limited to the details of the specific embodiment nor to the illustrated use but may be obviously used for other purposes including the operation of devices previously mentioned among others which require a thrusting and pulling force to open, close or otherwise adjust the element or function involved.

Referring to the single figure of the drawing, the improved actuator system comprises a variable speed motor 10 with a commutator and brush assembly 11 and a second similar motor 12 both of which are mounted within a housing 14 in spaced axial alignment with each other. A tubular shaft 16 is operatively connected to motor 10 for rotation thereby and is journalled near its left end in a supported bearing 18 and at its other end in a bearing 20 mounted in a support provided by a partition wall 22 which is fixedly positioned within the housing. Another tubular shaft 24 operatively connected to motor 12 is likewise journalled at its ends in bearings 26 and 28, the former being mounted in the support provided by wall 22 and the latter in a suitable support provided by another partition wall 30 provided with a retainer ring 31 for holding bearing 28 in place. The shafts 16 and 24 disposed in axial alignment with respect to each other are arranged to receive a driven member or shaft 32 extending therethrough and operatively engaged to the tubular shafts 16 and 24 for rotation thereby.

The common shaft or driven member 32 is engaged to tubular shaft 16 by balls 34 which are set in spherical recesses 36 provided on the surface of shaft 32. The balls 34 are arranged to ride in longitudinally extending splines or keyways 38 provided in the inner surface of tubular shaft 16. By this arrangement, the balls 34 lock the shaft 32 to the shaft 16, and shaft 32 must therefore rotate with the shaft 16. However, the balls 34 arranged to ride in the keyways 38 permit the shaft 32 to slidably move longitudinally in both directions i. e. back and forth in the shaft 16. Another portion of the shaft 32 indicated in the drawing is threadably engaged to the tubular shaft 24 by screw or helical threads 40 on the outer surface of the shaft 32 engaging corresponding screw threads 42 provided in the inner surface of the shaft 24.

With the arrangement as described, it will be seen that if the motors 10 and 12 are revolving at the same speed, the hollow shafts 16 and 24 and the driven shaft 32 will be locked together and will rotate as a unit. If shaft 24 is slowed down or speeded up relative to the speed of shaft 16, however, the driven shaft 32 which always rotates at the same R. P. M. as the shaft 16 will be forced to be displaced longitudinally therein by a distance corresponding to the displacement of threads 40 on shaft 32 by the threads 42 on the shaft 24. The direction of movement of the shaft 32 is dependent upon the direction of rotation of the motors 10 and 12, and whether the threads on the shafts 24 and 32 are left or right hand. If the motor 10 is slowed down or speeded up relative to the speed of the motor 12 or shaft 24 rotated thereby the same longtudinal movement will occur. It is readily seen that the thrusting or pulling force developed is a function of the variations in torque produced by a difference in either the speed or the direction of rotation of the two motors.

In a preferred embodiment, the driving means for rotating the tubular shafts comprise two direct current electric motors with their fields connected in series with variable rheostats 13 and further connected to a suitable source of power through the double-pole-double-throw reversing switches 15. The armatures of the motors 10 and 12 are connected directly to the source of power through the commutator and brush assemblies 11. Varying the field current by changing field resistance is a common method for varying the speed of D. C. motors, and the two motors 10 and 12 may thus be operated and controlled independently. By changing polarity, one motor can further be reversed with respect to the other. Torque limits would not be necessary because when lateral movement has reach either extreme, the two motors 10 and 12 would merely operate at the same speed with a resultant increase in slip on one or both of the motors. Such increase in slip would cause an overload which could be measured and used to actuate a thermal overload device arranged to automatically correct the malfunction. It will be understood that the motors used in the described arrangement may be either alternating current or direct current motors.

As illustrated in the drawing, the linear or longitudinal movement imparted to the driven shaft 32 may be used for actuating a valve 44 adapted to control the flow through a conduit 46. The shaft 32 is preferably connected to a stem or rod 48 of the valve 44 by means of a thrust bearing 47 which is mounted in the hub 49 of a ring member 50 and is held in place by a cap 52 which threadably engages hub 49. The valve stem 48 is likewise connected to the ring member 50 at 54 by any suitable fastening means as by the screw and nut arrangement shown in the drawing. It thus becomes possible to actuate the valve utilizing only the linear movement of driven shaft 32 with its rotational movement being imparted to the thrust bearing 47.

In some instances a brake assembly as generally indicated at 56 may be employed depending upon the specific application of the linear actuator. The function of the brake 56 would be to lock the valve stem 48 in position by means of brake shoes 58 equipped with brake lining 59 adapted to engage an annular drum element 60 positioned on the inner wall of the housing 14. The brake shoes 58 which are contained in the member 50 are actuated by solenoids 62. When the solenoids 62 are energized, the magnetic armature pulls the shoes inwardly and away from the face of the element 60 thereby releasing the assembly to permit longitudinal movement. As previously indicated, the brake serves the purpose of holding the valve or any other actuated element stationary while the motors are not running or during their starting and stopping periods. For example, the two motors 10 and 12 may not be speeding synchronously. As the brake 56 will prevent movement, the motors will be forced to speed together.

For limiting the longitudinal travel distance of driven shaft 32 in either direction, jam nuts 64 may be used in the manner indicated in the drawing. When the extreme distance is reached, the jam nuts 64 merely lock all three shafts 16, 24 and 32 together such that they all rotate together at the same speed. Such locked condition, however, may cause the motor developing the greater torque to drive the other. Should such a condition cause excessive motor slip, in turn causing excessive motor currents due to overload, the currents can be measured and used as an operator for correcting the irregularity.

In operation, assuming that the dual motor actuator of the present invention is being used for positioning a valve of the type illustrated in the drawing to control the fluid flow through a conduit as 46, the motors 10 and 12 are first started. The brake unit 56 will keep the three shafts 16, 24, and 32 locked together until the brake 56 is released. When the brake 56 is released by energizing the brake solenoids 62, the motors being of variable speed may then be regulated by changing the field current of motor 12 to slow down the speed of rotation of its shaft 24 relative to the rotative speed of shaft 16 driven by motor 10. This results in the longitudinal movement of the driven member 32 which movement is transmitted through the ring unit 50 to the valve stem 48 to produce the desired positioning of the valve. The rotative speed of shaft 16 may now again be changed so that it is equal to that of shaft 24. The brake 56 may then be actuated to the locking position and the motors 10 and 12 turned off, thereby completing the operation for any predetermined valve setting.

The above operation can be repeated automatically by using a conventional type flow meter in combination with a conventional type automatic controller but with such controller so arranged that it varies the field current of the two motors which position the valve such that the flow requirements are satisfied. This automatic operational control of flow could continue indefinitely and it is readily apparent that for such applications, the brake assembly 56 would not be necessary. It is also obvious that there are many conventional types of motor speed control which may be used for either automatic or manual operation of the actuator system comprising the present invention.

It is apparent that many widely differing embodiments of this invention may be made without departing from the spirit and scope thereof and it is not intended to be limited except as indicated in the appended claims.

What I claim is:

1. A linear actuator comprising a pair of rigidly and coaxially associated reversible motors having separate, tubular shafts extending coaxially within said motors and adapted to be separately rotated reversibly by said motors, a rod extending coaxially within both said shafts, first motion-transmitting means including a thread coacting between one of said shafts and said rod for reversibly moving the latter endwisely in response to rotation of said rod relatively to said one shaft, and second motion-transmitting means coacting between the other of said shafts and said rod to reversibly rotate said rod to modify its rotation relatively to said one shaft and thereby modify the endwise movement of said rod.

2. A linear actuator according to claim 1, further including means for separately varying the speed of said motors and the direction of rotation of said shafts.

3. A linear actuator according to claim 1, the speed of said motors being reducible by the torque load thereon, and said actuator further including brake means operable upon said rod to oppose endwise movement of the latter, and thereby equalize the speed of said motors to cause the latter to impart only rotary motion to said rod.

4. A linear actuator according to claim 1, said thread being one of two separate, interacting threads provided on said one shaft and said rod.

5. A linear actuator according to claim 1, further including means associated with said rod for limiting its endwise movement in opposite directions.

References Cited in the file of this patent

UNITED STATES PATENTS

| | | |
|---|---|---|
| 1,404,862 | Kirstatter | Jan. 31, 1922 |
| 1,836,559 | Smoot | Dec. 15, 1931 |
| 2,469,786 | Rieber | May 10, 1949 |
| 2,696,579 | Vander Veer | Dec. 7, 1954 |